United States Patent
Namm et al.

(10) Patent No.: US 7,689,165 B2
(45) Date of Patent: Mar. 30, 2010

(54) METHOD AND SYSTEM FOR COMMUNICATING WITHIN A WIRELESS COMMUNICATION NETWORK

(75) Inventors: Joseph C. Namm, Plantation, FL (US); Clara Sanchez, Davie, FL (US); Donald R. Griffis, Forest, VA (US); John J. Nauful, Forest, VA (US)

(73) Assignee: Motorola, Inc., Schaumburg, IL (US)

( * ) Notice: Subject to any disclaimer, the term of this patent is extended or adjusted under 35 U.S.C. 154(b) by 654 days.

(21) Appl. No.: 11/419,420

(22) Filed: May 19, 2006

(65) Prior Publication Data

US 2007/0270097 A1    Nov. 22, 2007

(51) Int. Cl.
| | |
|---|---|
| H04B 1/60 | (2006.01) |
| H04B 17/02 | (2006.01) |
| H04M 3/42 | (2006.01) |
| H04W 74/00 | (2009.01) |
| H04B 1/56 | (2006.01) |
| H04L 5/14 | (2006.01) |
| H04B 7/14 | (2006.01) |
| H04J 1/10 | (2006.01) |
| H04J 3/08 | (2006.01) |
| H04W 4/00 | (2009.01) |

(52) U.S. Cl. .................... 455/11.1; 455/9; 455/415; 455/455; 370/276; 370/315; 370/338

(58) Field of Classification Search ............... 455/11.1, 455/13.1, 15–17, 19, 435, 445, 450, 455, 455/3.01, 9, 41.3, 415, 416, 432.1, 435.1, 455/439, 454, 466, 519, 574; 370/254, 255, 370/315, 337, 338, 465, 218, 229, 276, 278, 370/312

See application file for complete search history.

(56) References Cited

U.S. PATENT DOCUMENTS

| | | | | |
|---|---|---|---|---|
| 4,056,779 | A | * | 11/1977 | Toler .......................... 455/11.1 |
| 4,056,780 | A |   | 11/1977 | Faulkner |
| 4,539,706 | A |   | 9/1985  | Mears et al. |
| 5,625,877 | A | * | 4/1997  | Dunn et al. .................. 455/454 |
| 5,642,350 | A |   | 6/1997  | Dailey |
| 5,790,938 | A | * | 8/1998  | Talarmo ..................... 455/11.1 |

(Continued)

FOREIGN PATENT DOCUMENTS

WO    2007136922 A2    11/2004

(Continued)

OTHER PUBLICATIONS

PCT International Preliminary Examination Report Application No. PCT/US2007/064626 Dated Dec. 4, 2008—8 Pages.

(Continued)

*Primary Examiner*—Nay A Maung
*Assistant Examiner*—Paul P Tran (57) ABSTRACT

A method and system for communicating within a wireless communication network (200) is provided. The communication between Portable Subscriber Units (PSUs) (104 and 106) by using a Vehicular Repeater (110) over a conventional communication link (102) is attempted (404). If the conventional communication link attempt fails (406), the communication is initiated directly from one PSU (104) to at least one other PSU (106) by using a direct channel link (202).

18 Claims, 5 Drawing Sheets

U.S. PATENT DOCUMENTS

| | | |
|---|---|---|
| 5,915,208 A | 6/1999 | Collyer |
| 6,233,228 B1 * | 5/2001 | Collar et al. ................. 370/315 |
| 6,580,704 B1 * | 6/2003 | Wellig et al. ................. 370/338 |
| 6,647,244 B1 | 11/2003 | Haymond et al. |
| 6,785,511 B1 | 8/2004 | Hengeveld et al. |
| 7,024,196 B1 * | 4/2006 | Kotzin ........................ 455/445 |
| 7,146,433 B2 * | 12/2006 | Cromer et al. .............. 709/239 |
| 7,519,351 B2 * | 4/2009 | Malone, III .............. 455/404.1 |
| 2004/0203342 A1 * | 10/2004 | Sibecas et al. ............. 455/11.1 |

FOREIGN PATENT DOCUMENTS

WO    2007136922 A3    11/2007

OTHER PUBLICATIONS

PCT International Search Report Application No. PCT/US2007/064626 Dated Dec. 21, 2007—8 Pages.

* cited by examiner (PRIOR ART)

METHOD AND SYSTEM FOR COMMUNICATING WITHIN A WIRELESS COMMUNICATION NETWORK

The present invention generally relates to a wireless communication network, and more particularly, to a method and system for communicating in a wireless communication network.

BACKGROUND OF THE INVENTION

Wireless communication systems have become very important in recent years. Most commercial and public-safety organizations need wireless communications. The importance of wireless communication is even more increased in emergency situations. For example, the police department requires efficient communication between different Portable Subscriber Units (PSUs) allotted to patrolmen, detectives, etc. Similarly, other agencies such as fire departments, transportation departments, water departments, etc., also require similar effective communication services.

However, utilization of PSUs for accessing communication services is often limited by the coverage and signal strength at the location of the PSUs. For example, a user can carry a PSU into the basement of a building, which may weaken the strength of the signal received by the unit. Further, the user can get a limited signal, or absolutely no signal, at a remote location such as the outskirts of a town or a city. There are also times when the communication link between a base station and the PSU is degraded or lost completely. The base station facilitates communication sessions between multiple PSUs in a particular area.

Various techniques are employed to provide wider coverage to PSUs in areas where the coverage provided by the fixed system is insufficient. One such technique utilizes mobile Vehicular Repeaters (VRs) to provide enhanced signals to PSUs. A VR installed in a vehicle includes an external antenna, which receives a signal from the base station, amplifies it, and sends the amplified signal to an internal antenna of the VR. The VR then sends the amplified signal to the PSU registered with the VR, thereby enabling the PSUs to maintain continuous communication.

If communication through a VR breaks down, the PSUs switch over to other mobile VRs available in their vicinity. However, this results in failed communication in the event of other VRs not being available in the vicinity of the failed VR. Therefore, there is a need for a method and system for providing coverage to PSUs when communication through a VR has failed.

BRIEF DESCRIPTION OF THE FIGURES

The accompanying figures, where like reference numerals refer to identical or functionally similar elements throughout the separate views, and which, together with the detailed description below are incorporated in and form part of the specification, serve to further illustrate various embodiments and to explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the particular method and system for communicating within a wireless communication network, in accordance with various embodiments of the present invention, it should be observed that the present invention resides primarily in combinations of method steps related to communication within a wireless communication network on the failure of a vehicular repeater. Accordingly, the apparatus components and method steps have been represented, where appropriate, by conventional symbols in the drawings, showing only those specific details that are pertinent to understanding the present invention, so as not to obscure the disclosure with details that will be readily apparent to those of ordinary skill in the art, having the benefit of the description herein.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such a process, method, article or apparatus. An element proceeded by "comprises . . . a" does not, without more constraints, preclude the existence of additional identical elements in the process, method, article, or apparatus that comprises the element. The term "another," as used in this document, is defined as at least a second or more. The terms "includes" and/or "having", as used herein, are defined as comprising.

A method for communicating within a wireless communication network is provided, in accordance with the present invention. The method includes attempting communication between Portable Subscriber Units (PSUs) by using a Vehicular Repeater (VR) over a conventional communication link. If and when the conventional communication link fails, the method includes communicating directly from one PSU to at least one other PSU by using a direct channel link.

Another method for communicating within a wireless communication network is provided, in accordance with the present invention. The method includes providing a Fixed Network Equipment (FNE) and a plurality of PSUs that are capable of communicating via a conventional communication link by utilizing a VR and attempting the conventional communication link from one of the PSUs to the VR. If the conventional link fails, the method includes automatically establishing a direct channel link between the particular PSU and the remaining PSUs, without the VR. The method further includes temporarily maintaining the direct channel link until the conventional communication link is again available.

A wireless communication network for communicating is provided, in accordance with various embodiments of the present invention. The wireless communication network includes FNE as well as a single mobile VR. The wireless communication network also includes a plurality of PSUs that are capable of communicating with each other via the single VR and the FNE by utilizing the conventional communication link. In accordance with the present invention, the wireless communication network includes a portable subscriber unit from the plurality of PSUs, to communicate directly with the remaining PSUs, without the FNE, the single VR, or the user input, by utilizing a direct channel link frequency when the conventional communication link fails.

Figure 1:
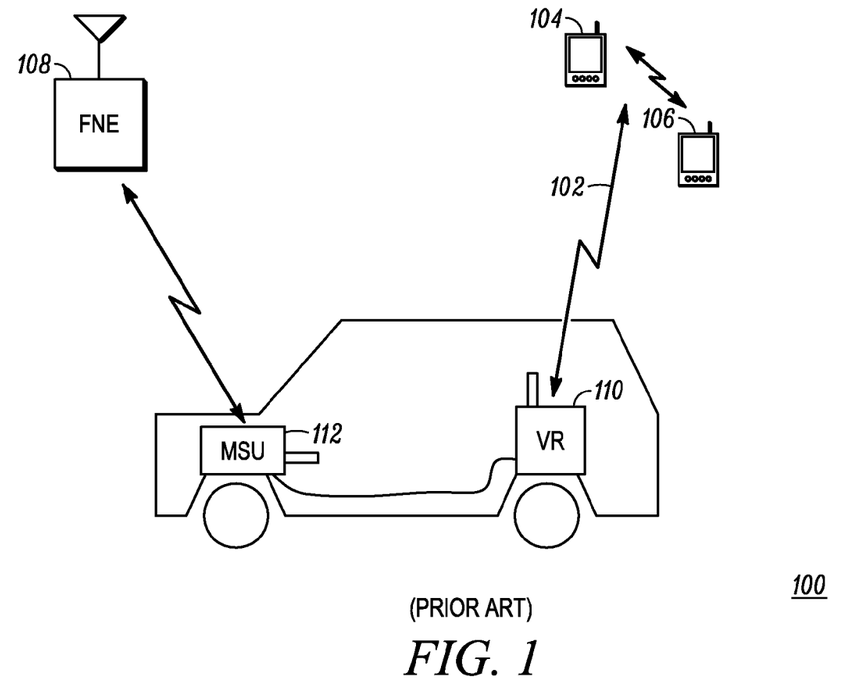
FIG. 1 illustrates a wireless communication network for communicating on a conventional communication link as known in the prior art.

FIG. 1 illustrates a wireless communication network 100 for communicating on a conventional communication link 102 as known in the prior art. The wireless communication network 100 is known to facilitate communication between one or more Portable Subscriber Units (PSUs). For example, a first PSU 104 and a second PSU 106 can communicate through the wireless communication network 100. Examples of the wireless communication network 100 can be an Advanced Mobile Phone System (AMPS) network, a Global System for Mobile Communications (GSM) network, a Digital Cellular Systems (DCS) network, a Code Division Multiple Access (CDMA) network, and a Universal Mobile Telecommunication Systems (UMTS) network.

Typically, the wireless communication network 100 includes a Fixed Network Equipment (FNE) 108, a mobile vehicular repeater (VR) 110 and a Mobile Subscriber Unit (MSU) 112. The wireless communication network 100 is known to include a plurality of PSUs. For the communication to start between the plurality of PSUs, first the FNE 108 authorizes and updates registration information of each PSU of the plurality of PSUs in the wireless communication network 100. Further, according to the methods known in the art the FNE 108 registers the MSU 112 and affiliates it to the wireless communication network 100. The MSU 112 then stores the registration information of each PSU of the plurality of PSUs. In some of the methods known in the art, the MSU 112 may store information about the talk groups associated with each PSU of the plurality of PSUs in the wireless communication network 100. The MSU 112 is hardwired with the VR 110 using RS 232 interface.

The VR 110 registers each PSU of the plurality of PSUs in association with a talk group. The talk group is a group of PSUs that share a communication session simultaneously. Typically, when a communication is needed between the plurality of PSUs in the wireless communication network 100 a group-voice request is sent to the FNE 108. In response to the group voice request, the FNE 108 sends a group voice channel grant to the PSU 104. The other PSUs, for example, the PSU 106, can use this group voice channel grant to start communication on the talk group. The PSUs communicate with each other on the wireless communication network 100 by using the conventional communication link 102. According to some methods known in the art, the communication session between the PSU 104 and the PSU 106 is initiated by pressing a Push-To-Talk (PTT) button on the PSU 104. The communication session may include transmitting voice or data. The PTT button is released after the voice or data is transmitted by the PSU 104.

The PSU 104 communicates with the PSU 106 through the wireless communication network 100 by using the VR 110 when the PSU 104 is at a location where the signal strength is weak. The VR 110 receives the signal from the FNE 108. The received signal is amplified by the VR 110 and transmitted to the PSU 104. Similarly, the PSU 104 sends the signal to the VR 110. This signal is amplified by the VR 110 and sent to the PSU 106. Thereby, the PSU 104 and the PSU 106 are able to communicate by using the VR 110, even when the signal strength is low at PSU 104 and PSU 106.

Figure 2:
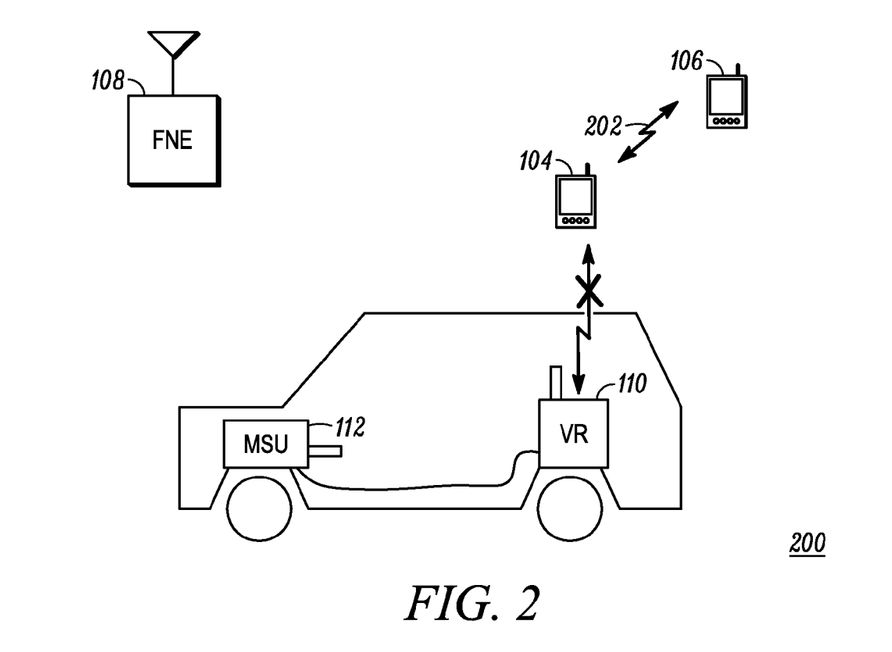
FIG. 2 illustrates an exemplary wireless communication network for communicating on a direct channel link, in accordance with some embodiments of the present invention.

FIG. 2 illustrates an exemplary wireless communication network 200 for communicating on a direct channel link 202, in accordance with various embodiments of the present invention. The direct channel link 202 refers to frequencies on which PSUs are able to communicate directly with each other without the system and without the VR 110. For an embodiment of the present invention, the direct channel link 202 is utilized by the PSU 104 for communicating with the PSU 106 when the VR 110 fails or encounters a functional problem. Further, when the conventional communication link 102 is not available for communication between the PSU 104 and the PSU 106, communication takes place on the direct channel link 202.

For an embodiment of the present invention, a timer is utilized by the PSU 104 to communicate on the direct channel link 202. The timer can be pre-programmed for a pre-determined time to keep a record of the time during which the direct channel link is not utilized for communication. For example, the timer can be programmed for 0 seconds minimum time, 10 seconds default time, and 30 seconds maximum time. The timer is started when the communication between the PSU 104 and the PSU 106 is terminated on the direct channel link 202. For an embodiment of the present invention, the direct channel link 202 can be utilized to establish a subsequent communication between the PSU 104 and the PSU 106 if the time expended during the previous communication is within the predetermined time limit. For example, the timer can be programmed for a maximum time of 30 seconds. The PSUs utilize the direct channel link 202 for a communication. After this, the direct channel link 202 can be utilized for the subsequent communication by the PSU 104 if the subsequent communication initiates within 30 seconds of the previous communication. For an embodiment of the present invention, for initiating a new communication session between the PSU 104 and the PSU 106, the PSU 104 attempts to utilize the conventional communication link 102 for transmitting voice and data. However, in the event of failure of the conventional communication link 102, the direct channel link 202 is utilized for communication.

Figure 3:
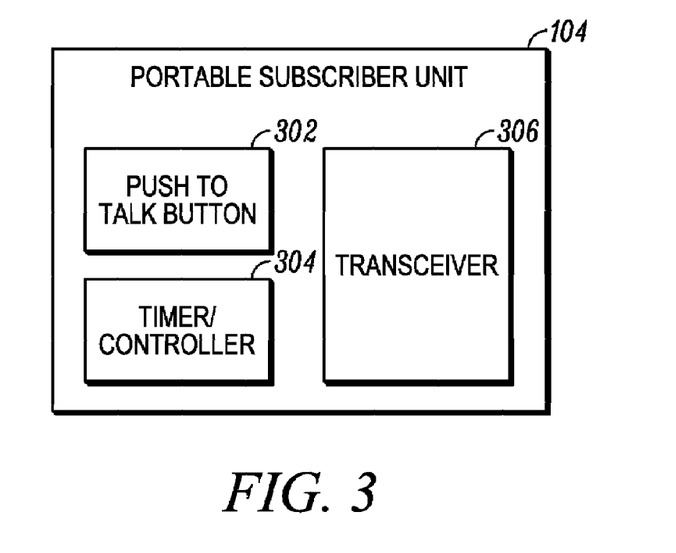
FIG. 3 illustrates a block diagram of a Portable Subscriber Unit (PSU) for communicating in a wireless communication network, in accordance with various embodiments of the present invention.

FIG. 3 illustrates a block diagram of the PSU 104 for communicating in the wireless communication network 200 on failure of the conventional communication link 102, in accordance with an embodiment of the present invention. The PSU 104 includes a Push-to-talk (PTT) button 302, a timer 304, and a transceiver 306. The PTT button 302 on the PSU 104 is pressed and kept on hold to initiate a communication from the PSU 104 to the other PSUs. The PTT button 302 is pressed until a talk-permit tone is heard, after which the voice signal can be transmitted from the PSU 104 to other PSUs on a talk group. A talk group of PSUs is selected to initiate the communication. This talk group includes PSUs that share the communication collectively. The talk groups are already established or are created before the communication begins. The talk groups can be created by sending invitations to the individual PSUs, or inviting a group of PSUs to join in a conference or a 'chat room'. The conference or the 'chat room' can either be open or restricted. The PTT button 302 can be released after sending the voice or data signals to the other PSUs.

The timer 304 is started when the PTT button 302 is released. The timer 304 is stopped when voice or data signals are subsequently received on the PSU 104 by one of the other PSUs. The timer 304 is restarted when the direct channel link 202 is dropped on the reception of a voice message at the PSU 104. The timer 304 is also stopped when any PTT button 302 is pressed by one of the PSUs subsequently. The PSU 104 attempts a communication by using the conventional communication link 102. Further, the timer 304 is stopped when the communication over the conventional communication link 102 has failed. In response to the failure of communication over the conventional communication link 102, the PSU 104 automatically reverts to the direct channel link 202 for communication. The PSU 104 further includes the transceiver 306, the transceiver 306 being capable of receiving and transmitting signals to the PSUs and the VR 110.

Figure 4:
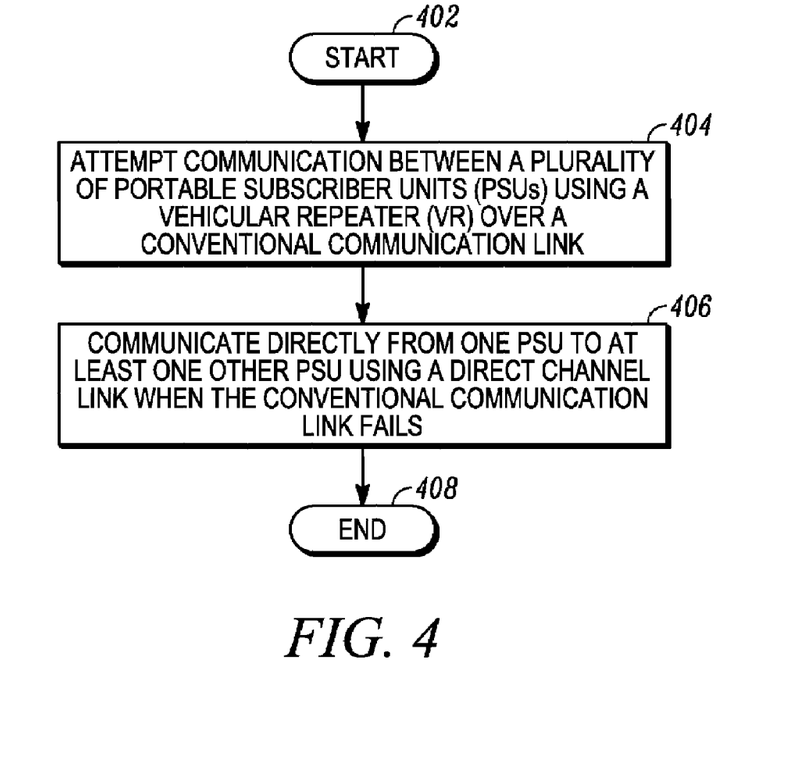
FIG. 4 is a flow diagram illustrating a method for communicating on a direct channel link within a wireless communication network, in accordance with various embodiments of the present invention.

FIG. 4 is a flow diagram illustrating a method for communicating on the direct channel link 202 within the wireless communication network 200, in accordance with various embodiments of the present invention. The method starts at step 402. At step 404, the PSU 104 attempts to initiate communication with the PSU 106 by using the VR 110 over the conventional communication link 102. For an embodiment of the present invention, the PSU 104 may attempt to initiate the communication with the PSU 106 over the conventional communication link 102 for a predetermined number of times. The PSU 104 can communicate with the PSU 106 by sending a group-voice request to the VR 110. This group-voice request may include a request for communication between a group of PSUs that have registered for a specific talk group. Hence, all the PSUs registered with the VR 110 on the talk group can send and receive voice or data signals and messages to each other collectively. The group-voice request is not granted when the conventional communication link 102 or the VR 110 has failed.

At step 406, the PSU 104 communicates with the PSU 106 by using the direct channel link 202 when the conventional communication link 102 has failed. The direct channel link refers to frequencies on which PSUs are able to communicate directly with each other without the system and without the VR 110. For an embodiment of the present invention, the direct channel link 202 can be automatically established without a user input. The PSU 104 bypasses the VR 110 and directly starts the transmission of voice by using the direct channel link 202. For an embodiment of the present invention, the direct channel link 202 is maintained for communication as long as voice or data is being transmitted from one PSU to at least one other PSU. For example, communication continues on the direct channel link 202 as long as transmission of voice or data is taking place from the PSU 104 to the PSU 106. After voice or data transmission to at least one other PSU is completed, the direct channel link 202 is dropped and the conventional communication link 102 is utilized for further communication. The process terminates at step 408.

Figure 5:
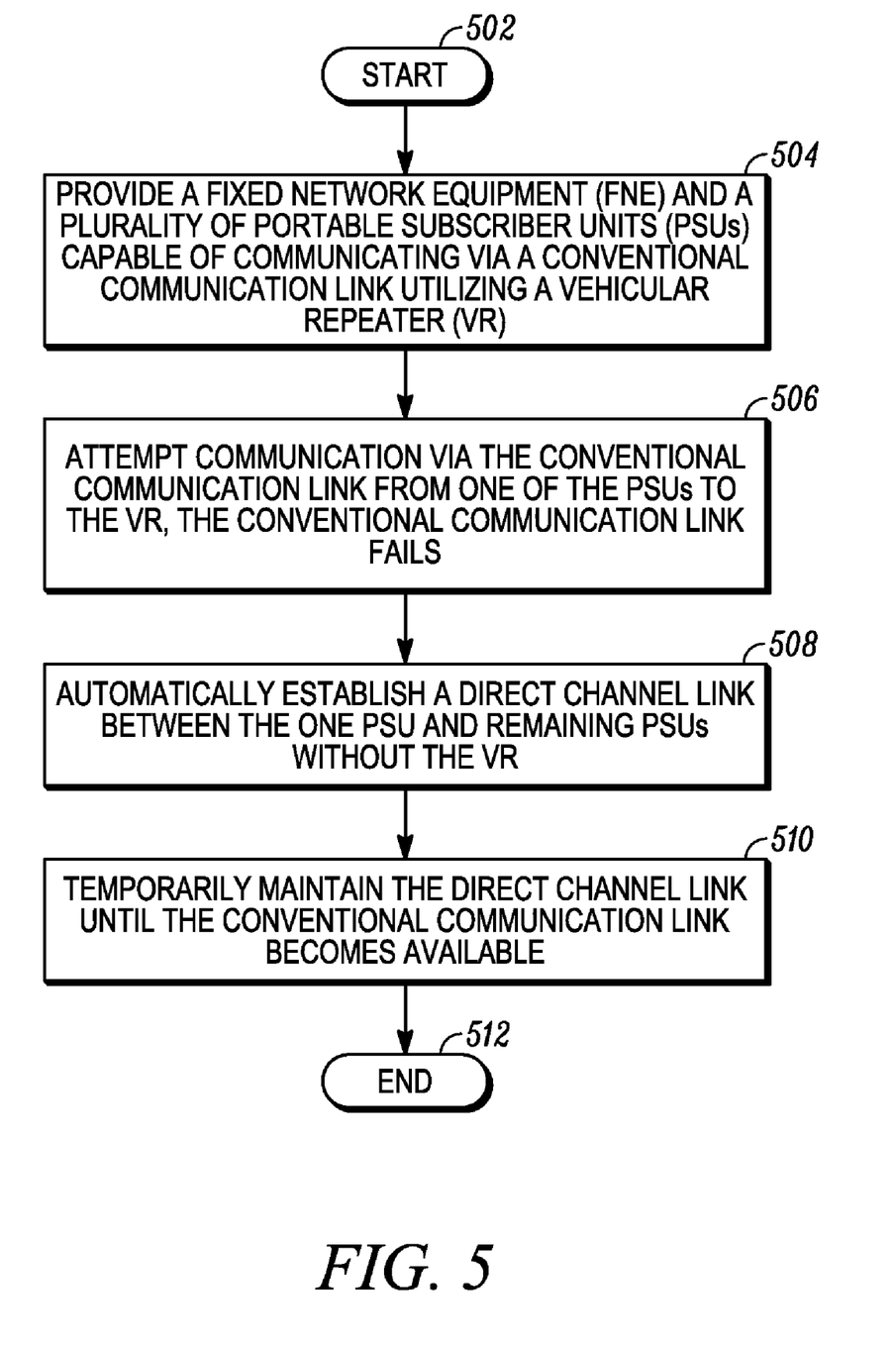
FIG. 5 is a flow diagram illustrating a method for communicating on a direct channel link within a wireless communication network, in accordance with an embodiment of the present invention.

FIG. 5 is a flow diagram illustrating a method for communicating on the direct channel link 202 within a wireless communication network 200, in accordance with an embodiment of the present invention. The method starts at step 502. At step 504, the FNE 108 and a plurality of PSUs are provided to the wireless communication network 200. The plurality of PSUs includes the PSU 104 and the PSU 106. The FNE 108 and the plurality of PSUs are capable of communicating via the conventional communication link 102 by utilizing the VR 110. At step 506, the PSU 104 attempts a communication between the PSU 104 and the PSU 106 by using the VR 110 on the conventional communication link 102. In the event of the failure of the VR 110, communication is attempted on the direct channel link 202. If the conventional communication link 102 is not available, the communication is attempted on the direct channel link 202.

For an embodiment of the present invention, the communication on the conventional communication link 102 can be attempted for a predetermined number of times by pressing a PTT button of the PSU 104. Pressing the PTT button 302 enables the PSU to transmit voice or data on the conventional communication link 102. For example, on the PTT button of the PSU 104 being pressed, the PSU 104 can attempt to communicate with the VR 110 on the conventional communication link 102 five times. For an embodiment of the present invention, at least one group-voice request is generated from the PSU 104 to the VR 110 each time the PTT button 302 is pressed, if the PSU 104 is in the range of the VR 110. The group-voice request may include a request for communication between a group of PSUs that have registered for a specific talk group. Hence, all the PSUs registered with the VR 110 on the talk group can send and receive voice signals and messages collectively to each other.

At step 508, the direct channel link 202 is automatically established between the PSU 104 and the remaining PSUs, for example, the PSU 106, without the VR 110, when the conventional communication link 102 has failed. The direct channel link refers to frequencies on which PSUs are able to communicate directly with each other without the system, or via VR. The direct channel link 202 is utilized by the PSU 104 to establish the communication session with the remaining PSUs in the wireless communication network 200. For an embodiment of the present invention, the remaining PSUs unmute in response to the voice being transmitted by the PSU 104 on the direct channel link 202. At step 510, the direct channel link 202 is temporarily maintained until the conventional communication link 102 is available for communication. For an embodiment of the present invention, the timer records the time during which the direct channel link 202 is still available. The method terminates at step 512.

Figure 6:
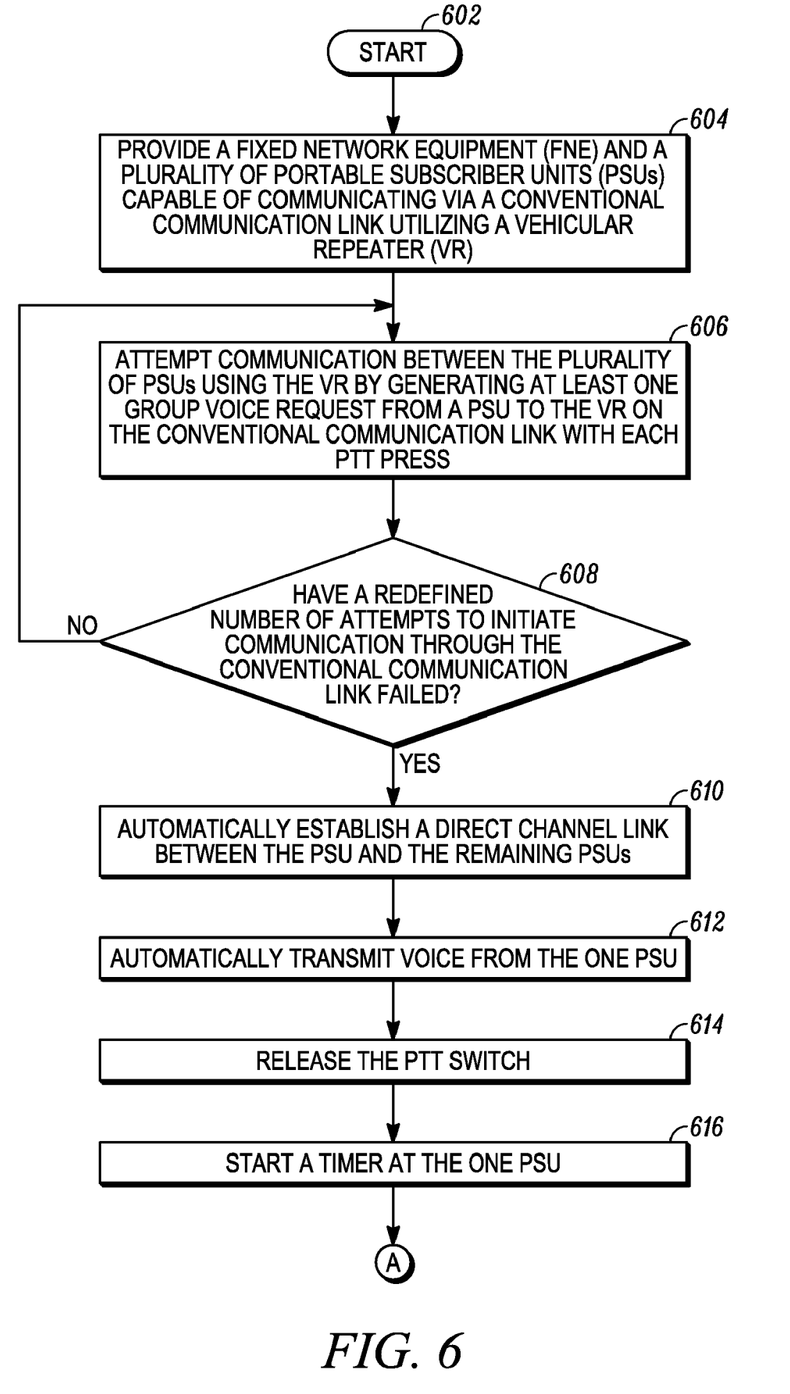
FIGS. 6 and 7 provide a flow diagram illustrating a method for communicating on a direct channel link within a wireless communication network, in accordance with another embodiment of the present invention.
Figure 7:
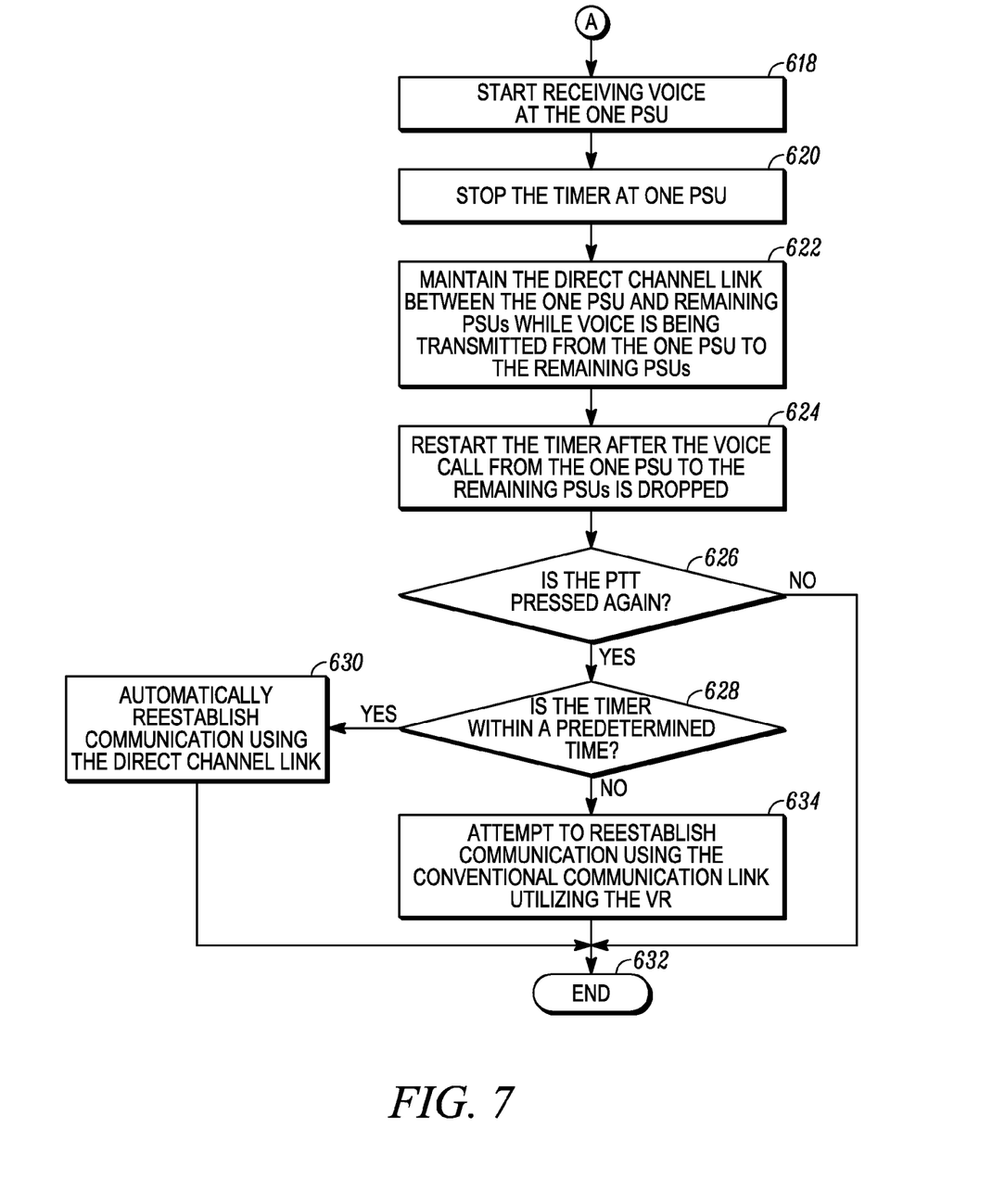

FIGS. 6 and 7 provide a flow diagram illustrating a method for communicating within the wireless communication network 200 on a failure of the conventional communication link 102, in accordance with another embodiment of the present invention. The method starts at step 602. At step 604, the FNE 108 and a plurality of PSUs are provided in the wireless communication network 200. The FNE 108 and the plurality of PSUs are capable of communicating via the conventional communication link 102 by utilizing the VR 110. The PSUs are registered with the VR 110 on a talk group. The talk group is a group of PSUs sharing a transmission of data or voice collectively. The PSUs can also communicate (together) with other PSUs in the talk group over the conventional communication link 102 by using the VR 110.

At step 606, one of the PSUs attempts communication with other PSUs using the conventional communication link 102. For an embodiment of the present invention, the communication on the conventional communication link 102 can be attempted a predetermined number of times by pressing a PTT button 302 of the PSU 104. The PTT button 302 is pressed to transmit voice or data information through the group-voice request. On pressing the PTT button 302 of the PSU 104, a group-voice request on the talk group is generated to initiate communication by using the conventional communication link 102.

For an embodiment of the present invention, each PTT button 302 pressed from the PSU 104 generates a new group-voice request to determine whether the PSU is in the range of the VR 110. The group-voice request can include a request for communication on a talk group. For example, all the PSUs registered with the VR 110 on the talk group can send and receive voice signals and messages collectively. The group-voice request cannot be completed when the PSU 104 is out of the range of the VR 110. The PSU 104 can send the group-voice request to the VR 110 consecutively a predetermined number of times. For an embodiment of the present invention, the PSU 104 makes five consecutive attempts to send the group-voice request to the VR 110 to initiate communication.

At step 608, the number of attempts to initiate the communication session by the PSU 104 is compared with a predetermined number of attempts. At step 608, if it is determined that the predetermined number of attempts to initiate communication by the PSU 104, by using the conventional communication link 102 has not failed, then step 606 is performed again.

If it is determined at step 608 that the predetermined number of attempts by the PSU 104 to initiate communication between the PSUs through the conventional communication link 102 has failed, then the method continues from step 610 else from step 606. At step 610, the PSU 104 establishes the direct channel link 202 between the PSU 104 and the remaining PSUs of the talk group. For example, the PSU 104 may attempt to initiate the communication with the PSU 106 five times by using the VR 110 on the conventional communication link 102. However, after the failure of the five consecutive attempts, the PSU 104 automatically establishes the communication on the direct channel link 202. For an embodiment of the present invention, prior to the establishment of the direct channel link 202, the PSU 104 generates a talk-permit tone. This talk-permit tone verifies the availability of the direct channel link 202 for communication between the PSU 104 and the PSU 106.

At step 612, the PSU 104 transmits a voice signal to the PSU 106 by using the direct channel link 202. At step 614, the PTT button 302 of PSU 104 is released after the voice signal is transmitted to the PSU 106. After the PTT button 302 is released, the direct channel link 202 becomes available to other PSUs of the talk group, for sending the voice signal. Moreover, a timer is started in response to the release of PTT button 302 at step 616. The timer can be pre-programmed to specify the predefined time for determining the time during which the direct channel link was utilized for communication. The programmed time of the timer can be, for example, 0 seconds minimum time, 10 seconds default time, and 30 seconds maximum time. The timer records the time during which the direct channel link 202 is not used. At step 618, the PSU 104 starts receiving voice or data signals from the PSU 106 on the direct channel link 202. For an embodiment of the present invention, the PSU 104 unmutes in response to the voice transmitted by the PSU 106. At step 620, the timer is stopped in response to the reception of voice at the PSU 104.

At step 622, the direct channel link 202 between the PSU 104 and the PSU 106 is maintained while the voice or message is being transmitted from the PSU 104 to the PSU 106. At step 624, the timer is restarted when the voice signal from the PSU 104 to the PSU 106, on the direct channel link 202, is dropped. At step 626, it is determined whether the PTT button 302 has been pressed again. If at step 626, it is determined that the PTT button 302 has been pressed again, then step 612 is performed.

At step 628, it is determined whether the time expended is within the predetermined time limit. The predetermined time is the time during which the direct channel link 202 can be utilized for communication by the PSU 104. If at step 628, it is determined that the time expended is still within the predetermined time limit, then the communication is automatically re-established by using the direct channel link 202 at step 630. Thereafter, the process terminates at step 632. However, if it is determined at step 628 that the time expended is not within the predetermined time limit, then an attempt is made to establish a subsequent communication on the conventional communication link 102 by utilizing the VR 110 at step 634. In an embodiment, the timer is restarted on the subsequent reception of voice on the conventional communication channel 102. Thereafter, the method terminates at step 632. If at step 626, it is determined that the PTT button 302 has not been pressed again, then the method terminates at step 632.

Various embodiments of the method and system for communicating in a communication network when a conventional communication link fails have been described above. Various embodiments of the present invention have significant advantages over the methods and systems that existed in the prior art. When the failure of a conventional communication link is detected, the PSU automatically reverts from using a conventional communication link to a direct channel link for communication. Hence, the invention enables PSU users to communicate even when the VR fails. This ensures smooth and continuous communication between PSUs, even when the conventional communication link has failed.

It will be appreciated that the method and system for communicating within a wireless communication system described herein may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method to communicate in a wireless communication network. Alternatively, some or all the functions could be implemented by a state machine that has no stored program instructions, or in one or more application-specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein, will be readily capable of generating such software instructions, programs, and ICs with minimal experimentation.

In the foregoing specification, the invention and its benefits and advantages have been described with reference to specific embodiments. However, one of ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required or essential features or elements of any or all the claims. The invention is defined solely by the appended claims, including any amendments made during the pendency of this application, and all equivalents of those claims as issued.

What is claimed is:

1. A method of communicating within a wireless communication network, comprising the steps of:
   providing Fixed Network Equipment (FNE) and a plurality of Portable Subscriber Unit (PSUs);
   attempting communication between one PSU and at least one other PSU by using a Vehicular Repeater (VR) over a conventional communication link; and
   communicating directly from the one PSU to the at least one other PSU by using a direct channel link when the conventional communication link fails;
   maintaining the direct channel link as long as voice is being transmitted from the one PSU to the at least one other PSU;
   starting a timer when the direct channel link is dropped,
   establishing subsequent communications by utilizing the direct channel link if the timer is within a predetermined time; and
   establishing subsequent communications by utilizing the conventional communication link if the timer has expired by using the conventional communication link by utilizing the VR and FNE.

2. The method as recited in claim 1, further comprising a prior step of attempting to initiate communication over the conventional communication link for a predefined number of times.

3. The method as recited in claim 1, wherein the direct channel link is automatically established without user input.

4. The method as recited in claim 1, wherein the subsequent communications are established by initiating a push-to-talk (PTT) feature on a Portable Subscriber Unit (PSU).

5. The method as recited in claim 1, further comprising the step of stopping the timer when communications over the direct channel link are present.

6. A method of communicating within a wireless communication network, comprising the steps of:
   providing Fixed Network Equipment (FNE) and a plurality of Portable Subscriber Units (PSUs) capable of communicating via a conventional communication link by utilizing a Vehicular Repeater (VR);
   attempting the conventional communication link from one of the PSUs to the VR, the conventional communication link failing;
   automatically establishing a direct channel link between the one PSU and remaining PSUs without the VR, in response to the conventional communication link failing;
   temporarily maintaining the direct channel link as long as a voice signal is being transmitted from the one PSU to the remaining PSUs;
   starting a timer when the voice signal from the one PSU to the remaining PSUs is dropped;
   establishing subsequent communication by using the direct channel link, if the timer is within a predetermined time; and
   establishing subsequent communications by using the conventional communication link by utilizing the VR if the timer has expired by using the conventional communication link by utilizing the VR and FNE.

7. The method as recited in claim 6, wherein the step of attempting a conventional communication link is attempted a predetermined number of times by pressing a push-to-talk (PTT) button of the PSU.

8. The method as recited in claim 7 further comprising:
   generating at least one group-voice request from the PSU to the VR with each PTT button press to determine if the PSU is in range of the VR.

9. The method as recited in claim 6, further comprising the step of unmuting the remaining PSUs in response to receiving voice being transmitted by the one PSU on the direct channel link.

10. The method as recited in claim 6, further comprising:
    pressing a PTT button on the one PSU to attempt the conventional communication link;
    releasing the PTT button when the conventional communication link has failed;
    starting a timer at the one PSU in response to the conventional communication link failure; and
    automatically transmitting voice, in response to the PTT button press, from the one PSU to the remaining PSUs upon receiving voice, wherein the timer is stopped upon receiving voice.

11. The method as recited in claim 6, wherein the step of temporarily maintaining the direct channel link comprises maintaining the direct channel link until the conventional communication link becomes available.

12. A wireless communication network, comprising:
    fixed network equipment (FNE);
    a single mobile vehicular repeater (VR);
    a plurality of portable subscriber units (PSUs) capable of communicating with each other via the single VR and FNE by utilizing a conventional communication link;
    a PSU from the plurality of PSUs communicating directly with remaining PSUs, without the FNE and single VR and without user input, by utilizing a direct channel link when the conventional communication link fails, wherein the direct channel link is maintained as long as a voice signal is being transmitted from the PSU to the remaining PSUs;
    wherein a timer is started when the voice signal from the PSU to the remaining PSUs is dropped;
    if the timer is within a predetermined time subsequent communication is established by using the direct channel link; and
    if the timer has expired subsequent communication is established by using the conventional communication link by utilizing the VR and FNE.

13. The wireless communication network as recited in claim 12, wherein each PSU of the remaining PSUs unmutes in response to receiving voice from the PSU.

14. The wireless communication network as recited in claim 13, wherein the plurality of PSUs each include a push-to-talk (PTT) timing feature in which a timer is started when a PTT button is released.

15. The wireless communication network as recited in claim 14, wherein the timer is stopped upon subsequent reception of voice and wherein the timer is restarted in response to the direct channel link being dropped.

16. The wireless communication network as recited in claim 15, wherein the timer is stopped in response to any subsequent PSU PTT button press, and communication by using the conventional communication link is attempted.

17. The wireless communication network as recited in claim 16, wherein in response to the conventional communication link failing, the PSU automatically reverts to the direct channel link, and the PTT timer is stopped.

18. The wireless communication network as recited in claim 17, wherein the timer is restarted when the PTT button is released.

* * * * *